Nov. 30, 1954 F. S. GIBBS 2,695,710
FLOTATION AND CLARIFICATION APPARATUS
Filed Oct. 12, 1949 4 Sheets-Sheet 1
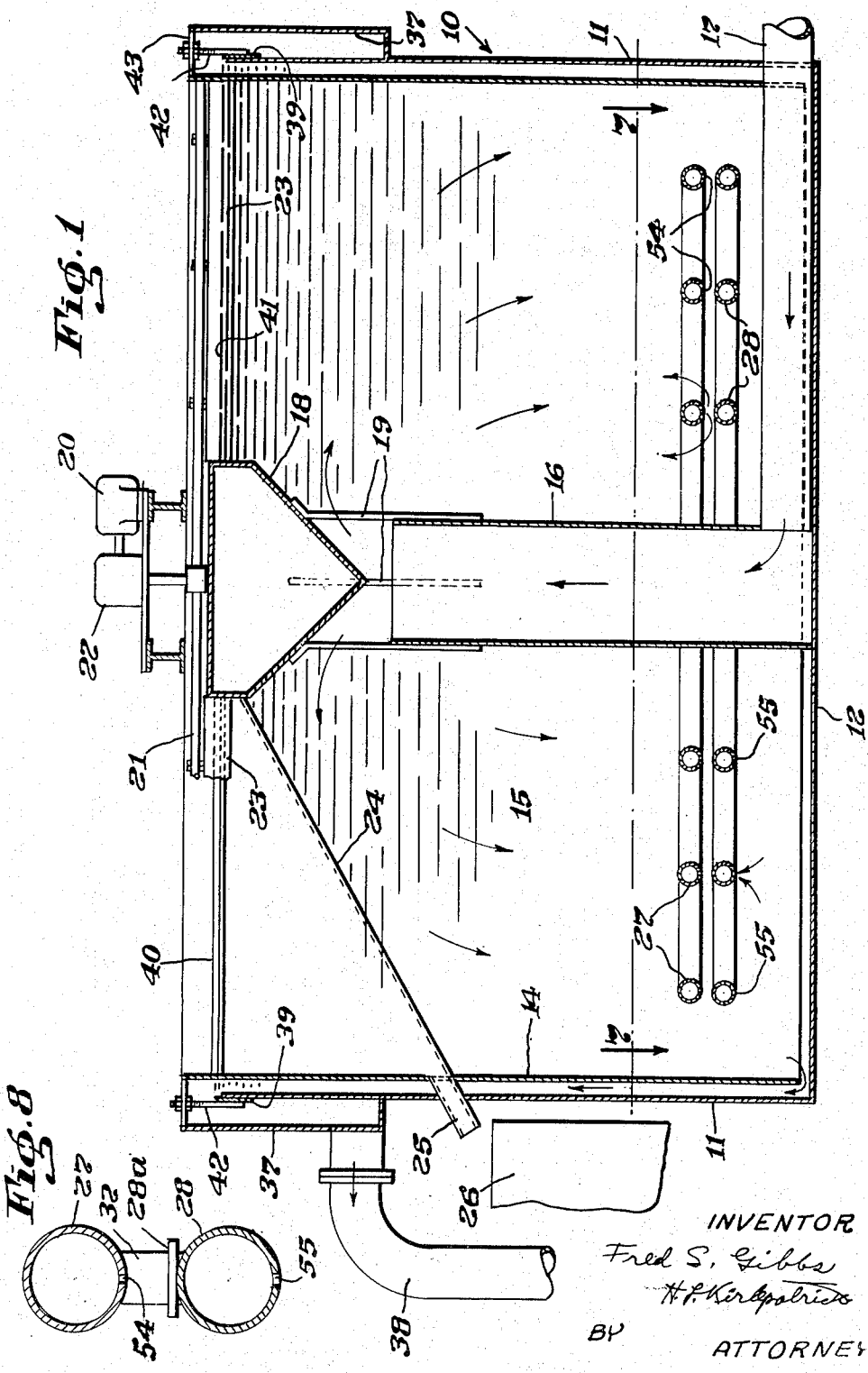
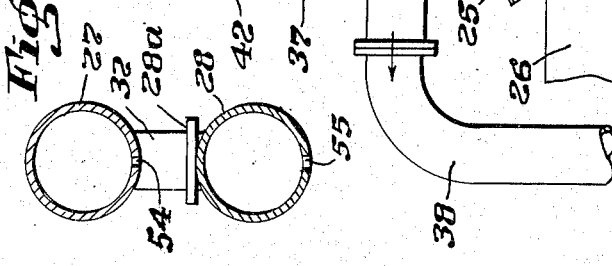
INVENTOR
Fred S. Gibbs
H. P. Kirkpatrick
BY
ATTORNEY

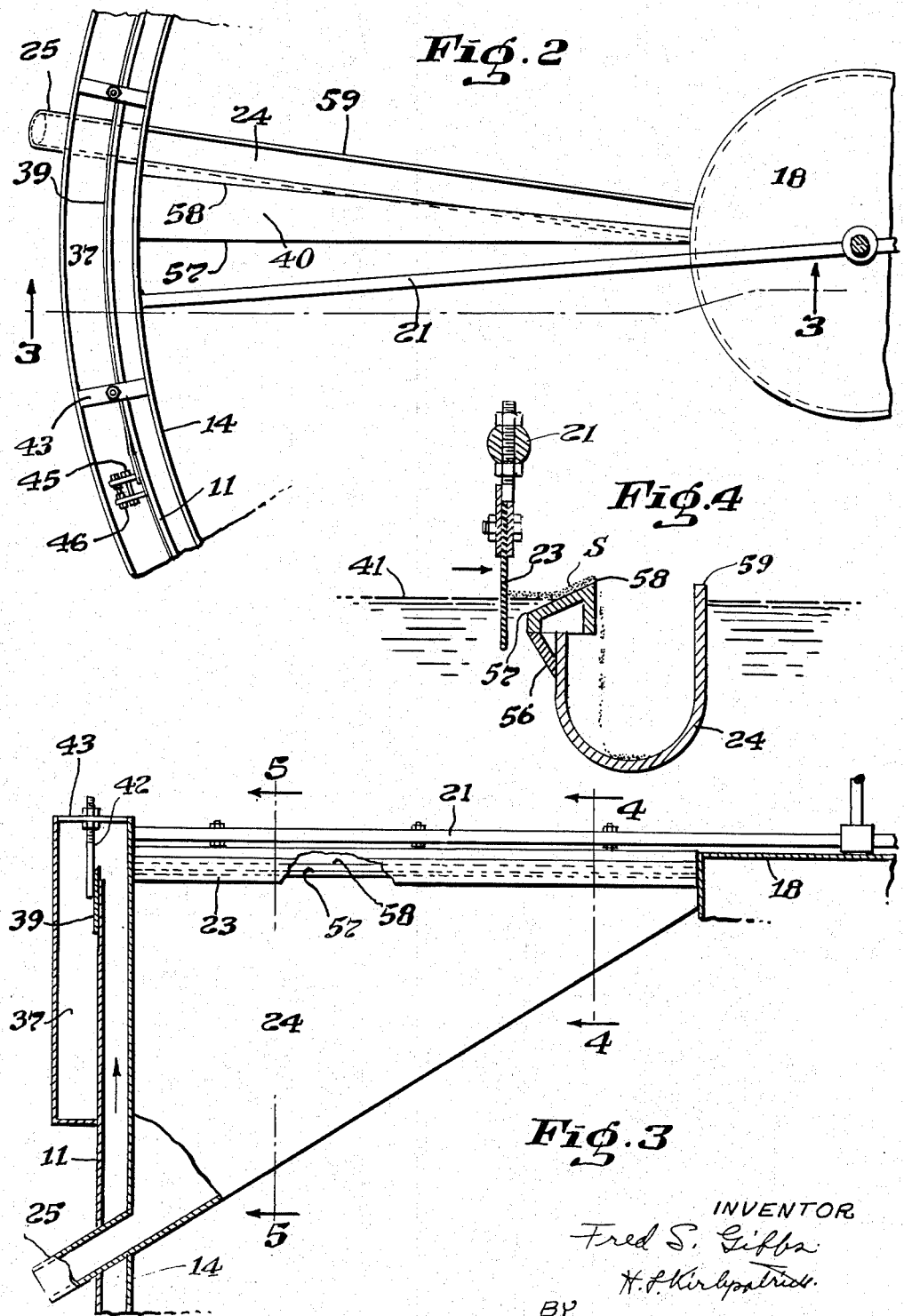

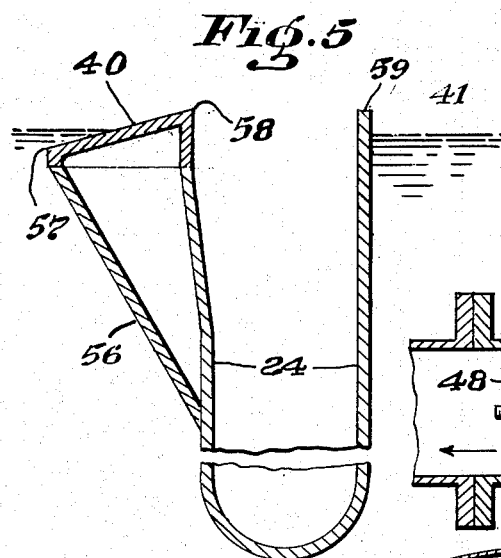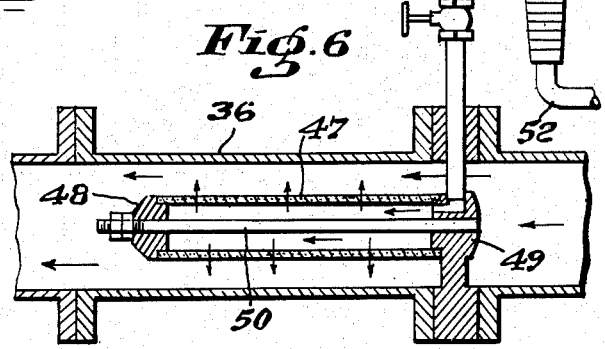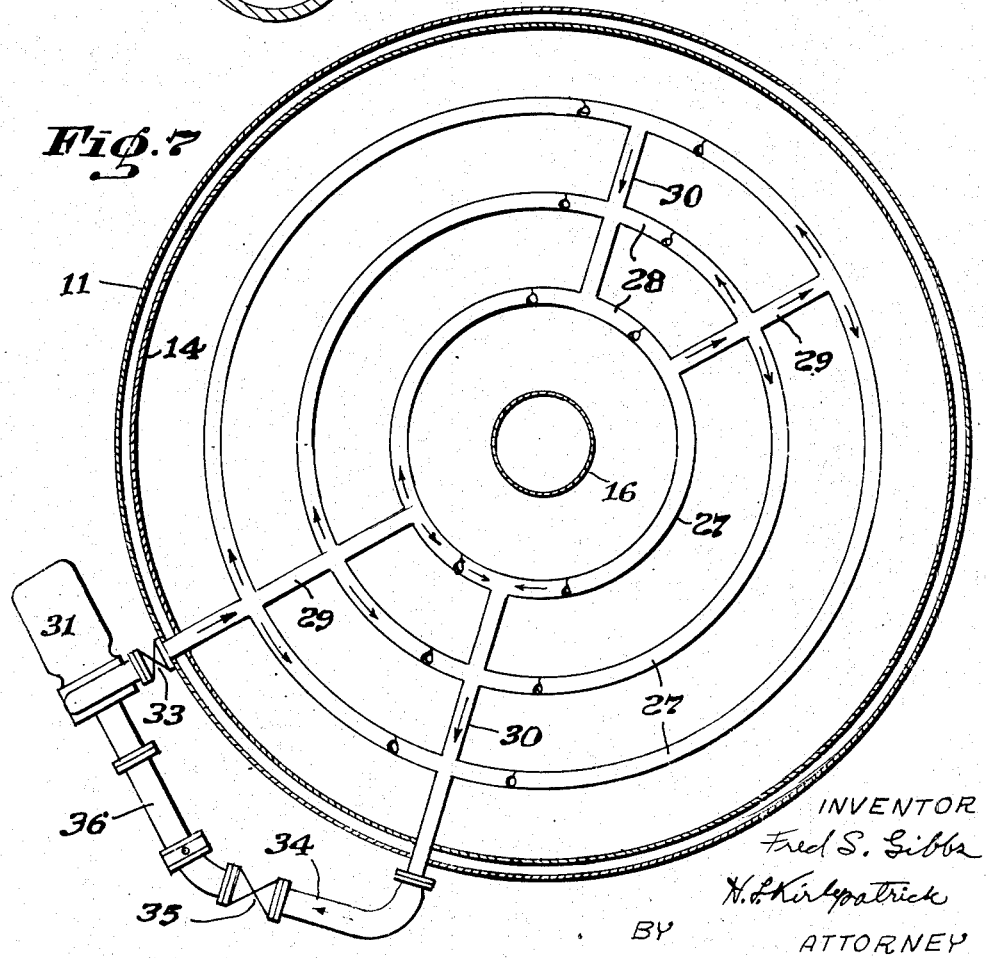

Nov. 30, 1954     F. S. GIBBS     2,695,710
FLOTATION AND CLARIFICATION APPARATUS
Filed Oct. 12, 1949     4 Sheets-Sheet 4
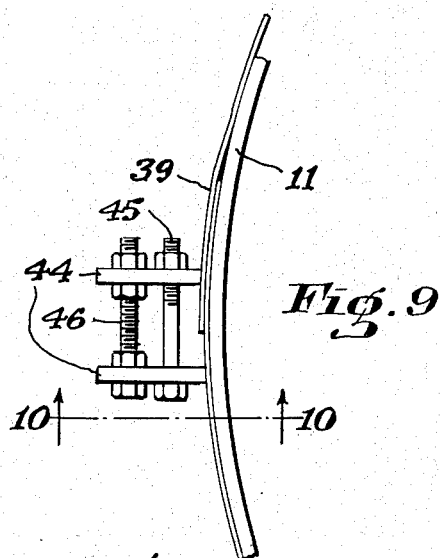
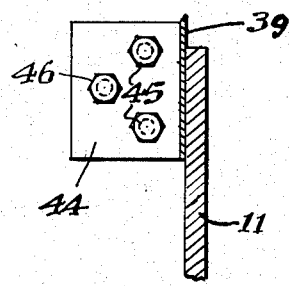
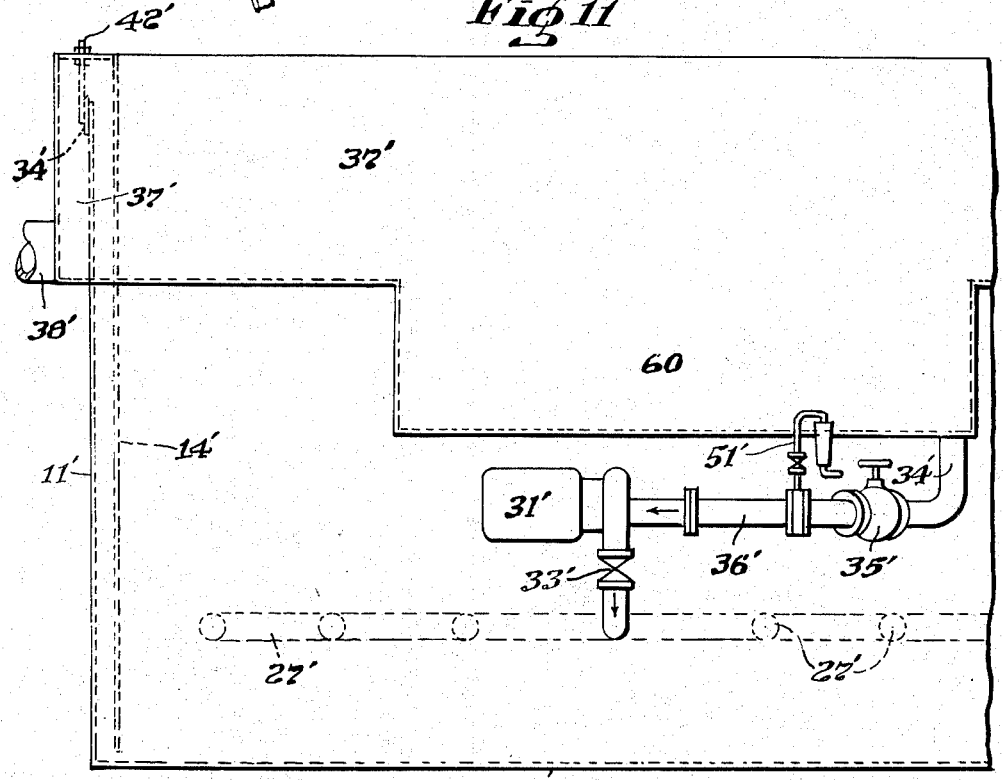

United States Patent Office 2,695,710
Patented Nov. 30, 1954

2,695,710

FLOTATION AND CLARIFICATION APPARATUS

Fred S. Gibbs, Waban, Mass., assignor to F. S. Gibbs, Inc., Boston, Mass., a corporation of Massachusetts Application October 12, 1949, Serial No. 120,943

3 Claims. (Cl. 210—53)

My invention relates to the treatment of liquids to separate substances carried in suspension in the liquids and embraces improvements both in method and apparatus. The invention is considered particularly valuable as applied to the purification and clarification of public and industrial waste waters but is not limited thereto, being also applicable, for example, to the treatment of water supplies.

The simplest method presently being employed in the clarification of liquids such as industrial waste waters, involves the quiescent settling of the liquid either with or without prior chemical or mechanical treatment designed to effect agglomeration or coagulation of the contained impurities. Following the settling, which is of variable duration, the settled sludge and the supernatant liquid are separated by decantation. In some cases, mechanical means are employed to concentrate the settled sludge for ease in further handling.

Theoretically, quiescent settling should provide quite satisfactory results, but in actual practice it has been found that there are many distinct disadvantages attaching to this type of clarification. Thus, large and expensive settling vessels with extensive space and area requirements are generally needed. In many instances, the sludge volumes are so excessive and the sludge is of such low consistency (high liquid content) that its handling, dewatering, and disposal become impractical, presenting a problem greater in magnitude than the clarification itself.

The disadvantages of quiescent or batch settling have brought forth many designs for continuous flow systems. These systems include various types of settling basins, baffled to prevent short-circuiting, and many so-called high-rate "sludge-blanket" units. The settling basins, as in the case of quiescent settling, are necessarily large and expensive structures with extensive space and area requirements. The high-rate units, while permitting larger flow rates per unit of area, thus reducing space and area requirements, otherwise represent little improvement in many cases. Both schemes demand that the suspended matter settle into a sludge formation which will resist any and all currents, a requirement which greatly limits their use. When the suspended matter is not of such nature, the operating efficiencies are most erratic and the quality of the liquid effluent so poor that it is very difficult, indeed, to justify the capital outlay represented by the cost of the basic structures and the auxiliary equipment, disregarding the high maintenance and operating costs.

My invention has as its principal object to provide a practical and economical method for clarifying liquids of the indicated type which is not dependent for its operability on the ability of the contained suspended matter to settle into a tight sludge formation.

A further and corollary object is to provide a system of apparatus suitable for the practice of the method.

My invention derived from a recognition of the fact that the characteristics of the suspended matter in the suspensions with respect to which the prior art fails are such as to make possible separation of the suspended matter by a procedure representing a complete reversal of the conventional methods. Thus, in accordance with my invention, instead of settling out the suspended matter, I cause the particles to move to and concentrate upon the surface of the liquid. I effect the decrease in the specific gravity of the particles, necessary before they will rise to the surface of the liquid, by means of minute gas bubbles which become attached to the particles.

I have found that in a system involving flotation of the suspended particles, the liquid flow in the flotation zone should preferably be generally downwardly in order to avoid the creation of disturbances at the surface of the liquid interfering with the collection and removal of the surfaced particles or sludge. Thus, according to my invention, the specific gravity of the suspended particles may be reduced to a substantially greater extent than would be necessary if the liquid flow were transverse the flotation zone.

The invention in its apparatus aspects represents a novel flow design providing maximum capacity with minimum structure. A feature of the apparatus resides in the means employed to produce the gas bubbles in the size and quantity required. Another feature resides in the means serving in the removal of the sludge from the surface of the liquid confined in the flotation zone. A further feature resides in the means employed to maintain the level of the liquid in the flotation zone within predetermined narrow limits irrespective of changes in the rate of flow of liquid through the apparatus. Still other features will be apparent from the following detailed description and the accompanying drawings in which:

Fig. 1 is a vertical section through the main body of the apparatus, shown as preferably constructed—certain parts at the top of the figure being broken away for clarity;

Fig. 2 is a fragmentary plan drawn to a larger scale than Fig. 1 and illustrating the means concerned with the collection and removal of the surfaced sludge;

Fig. 3 is a view on the line 3—3 of Fig. 2, one of the parts being shown partly broken away;

Fig. 4 is a vertical section on the line 4—4 of Fig. 3;

Fig. 5 is a vertical section on the line 5—5 of Fig. 3;

Fig. 6 is a detail, partly in section and partly in elevation, directed to the means for supplying the necessary gas bubbles;

Fig. 7 is a plan view of the ring sets appearing at the bottom of the unit in Fig. 1;

Fig. 8 is a detail in which two of the rings appear in section;

Figs. 9 and 10 are detail views directed to the liquid level control means; and

Fig. 11 is an elevation illustrating a modified form of apparatus.

Referring now to the drawings, particularly Fig. 1 thereof, the numeral 10 generally denotes a flotation vessel having a cylindrical wall portion 11 and a circular bottom plate 12. Spaced from the wall 11 and concentric therewith is an annular baffle 14 supported as on spaced legs, not shown, secured to the bottom plate 12.

Within the flotation zone or chamber 15 and concentric with the baffle 14 is a riser pipe 16 receiving influent liquid from a pipe 17 passing through an aperture in the wall 11 and a notch in the lower portion of the baffle 14. A distributor member 18, the lower portion of which has the form of an inverted cone, overlies the riser pipe 16 and is supported by the pipe through brackets 19. The distributor member serves to spread the liquid leaving the mouth of the riser pipe radially over the cross section of the flotation zone and prevents disturbance of the surface of the body of liquid in the zone, this surface being maintained substantially quiescent at all times.

Mounted above the flat circular top of the distributor member 18 is an electric motor 20 adapted to drive a horizontal shaft 21, having a length substantially matching the diameter of the baffle 14, through reduction gearing 22. The shaft carries two flexible skimmer blades 23 fabricated of a material resistant to the particular liquid. These blades operate, as hereinafter described, to sweep surfaced sludge into a sludge collection trough or compartment 24, which discharges through a pipe 25 to a receiver 26 outside the flotation vessel. Fixed to the forward edge of the trough and extending radially from the distributor member 18 to the baffle 14 is a riser plate 40 over which the sludge is conveyed by the blades 23 before it enters the collection trough.

Surrounding the riser pipe 16 near the bottom of the flotation zone 15 and supported as by brackets, not shown, extending from the baffle 14, are two similar sets of apertured rings 27 and 28, one set being disposed above the other with corresponding rings in vertical alignment. The rings of each set are concentric and communicate through cross members 29 and 30, respectively, the entire assembly in each case representing a manifold or "header." The upper header, comprising rings 27, is connected (see Fig. 7) to the discharge side of a pump 31 through a throttle valve 33 positioned outside the wall 11, while the header comprising rings 28 is joined outside the wall 11 to a connection 34 extending to the suction side of the pump. Connection 34 has a throttle valve 35 and a spool piece 36 disposed therein.

The liquid entering the system via the pipe 17 may be, for example, waste liquor from a soap manufacturing plant containing floatable fatty acid values or, for further example, it may be a "white water" from a paper mill. The liquid may or may not have been chemically or mechanically pretreated depending upon whether or not the suspended matter is inherently floatable by the method herein or requires preliminary processing to render it floatable. In some cases, the preliminary treatment may represent an emulsion-breaking operation, while in other cases the treatment may involve merely the addition of a pH control agent serving to precipitate or cause agglomeration or coagulation of the substance or substances, removal of which is desired.

As the liquid moves downwardly toward the ring sets or headers, it meets an ascending stream of minute gas bubbles, supplied from the header comprising the rings 27, the bubbles serving to strip the liquid of the suspended particles. The stripped liquid passes under the lower edge of the baffle member 14 and then flows upwardly in the weir chamber delineated by the baffle and the annular wall 11.

Extending around the upper portion of the annular wall 11 is a circular trough 37 in which clarified effluent is collected for discharge through the pipe 38. Liquid overflowing into the trough passes over an adjustable annular weir 39 by means of which the liquid level in the unit is controlled. The adjustment of the weir 39 is such that at the particular rate or rates of flow the liquid level 41 is always above the level of the leading edge of the riser plate 40 but below the discharge edge thereof (see Fig. 5).

Weir 39 may be made adjustable by any suitable means. In the construction shown, the adjustment is effected through manipulation of the nuts on the spaced vertical threaded rods 42 welded to the weir and extending upwardly through horizontal supports 43 which bridge across the baffle 14 and the concentric liquid discharge channel or trough 37. Leakage between the weir and the annular wall 11 is prevented by compression of the weir against the wall, the means provided for this purpose (see Figs. 9 and 10) comprising flange pieces 44, welded or otherwise suitably secured to the overlapping ends of the weir band, a pair of tightening studs 45 and a spreading stud 46. Ordinarily, between 60 and 75% of the area of the weir is in contact with the wall.

Reverting now to the lower portion of the unit—as the operation proceeds, liquid is continuously withdrawn from the bottom of the chamber 15 through the header member comprising apertured rings 28 and thence through the spool piece 36 to the pump 31. In the spool piece is disposed (see Fig. 6) an elongated porous tube 47 which is enveloped by the flowing liquid. This tube, which may be formed of Carborundum, Alundum or other porous material of similar characteristics, is closed at its ends by plugs 48 and 49 which connect through a tie rod 50. Plug 49 is provided with a threaded aperture receiving a valve-controlled pipe 51 through which the gas required for the flotation is supplied. Normally, the gas used is simply air, the connection 52 in this event being open to the atmosphere. A visual indication of the quantity of gas entering the tube is provided by the volumetric gauge 53, which is of a common recognizable type.

The flotation gas is drawn into the tube and through the porous walls thereof by the negative pressure in the line 34 induced by throttling of the valve 35. It has been found that very large quantities of gas can be thus introduced into the system without effecting the efficiency of the pump. The gas enters the liquid enveloping the tube in the form of very small independent bubbles which do not tend to agglomerate into larger bubbles which would be ineffective in the flotation.

Pump 31 forces the gas-charged liquid into the header or manifold comprising rings 27, the charged liquid thus being distributed uniformly over the cross section of the zone 15. It is to be observed from Fig. 8 that the apertures 54 in these rings are spaced along the bottom of the rings and that they are somewhat smaller than the apertures 55 in the rings 28 in order to attain a somewhat jet-like effect. Elements 32 intermediate the headers are spaced plates, while the flat annular members 28a, which are coextensive with the lower rings, serve as baffles facilitating uniform distribution of the liquid jetting from the apertures 54.

As the minute gas bubbles ascend to the surface of the liquid in the flotation zone, they become entrapped in the suspended particles and carry these particles to the surface of the liquid. Depending on the nature of the particular suspension most, if not all, of the stripping action may take place at a depth only slightly below the liquid level 41. Usually, the gas-loaded particles are initially quite small but they quickly attach to each other and become progressively larger as they approach the surface. At the surface, the particles form a scum or sludge which must be removed without agitation, since agitation of the liquid would result in settling of some or all of the sludge and contamination of the liquid effluent. It is also usually desirable to remove the sludge in as concentrated a form as possible. The arrangement shown for effecting the removal of the surfaced sludge answers nicely to both of these requirements.

The flexible blades 23 which may be formed, for example, of natural or synthetic rubber, are so adjusted that their lower horizontal edges lie below the surface of the liquid 41 and the leading edge 57 of the riser plate 40 (Figs. 4 and 5). This plate is supported by the sludge collection trough 24 through a plate 56, welded or otherwise suitably secured to the trough and to the riser plate. The width of the supporting plate 56 varies in proportion to the distance from the inverted conical distributor member 18.

Each of the edges 57 and 58 of the riser plate is perfectly level or horizontal and is on a true radial line with relation to the point about which the shaft 21 carrying the blades 23 revolves. The discharge edge 59 of the trough 24 is also perfectly horizontal, but the line of this edge, which, like the discharge edge of the riser plate, stands somewhat above the liquid level, is not on a true radial line.

As in the case of the supporting plate 56, the width of the riser plate 40 at any point is directly proportional to the distance from the inverted conical distributor member. Similarly, the depth of the trough 24 varies depending upon the distance from this member.

On movement of the diametrically opposed blades about the member 18 with the outer edges of the blades touching the annular baffle 14 and with their lower horizontal edges below the liquid surface, all surfaced sludge S is trapped in front of the blades and conveyed toward the riser plate. Depending on the volume and character of the sludge, when the blades are within 15° to 60° of the leading or underwater edge of the riser plate, the sludge ahead of the blade begins to move up the inclined surface of the plate toward the discharge edge thereof. Liquid contained in this sludge drains backward as the sludge is pushed above the liquid level. As the blade moves nearer the leading edge of the plate, the sludge most forward of the blade moves over the discharge edge of the plate and drops into the sludge compartment. By the time the blade reaches the leading edge of the plate, essentially all of the sludge trapped in front of the blade has either dropped into the sludge compartment or is on the top of the plate. Since the lower horizontal edge of the blade lies several inches below the level of the leading edge of the plate, the blade must deform as it continues its clockwise movement. This deformation provides a squeegee action serving to remove a large portion of liquid from the sludge. The blade is at maximum deformation at the point of the discharge edge of the plate. On passing such edge it momentarily resumes its original vertical position.

The edge 59 of the trough 24, as has been noted, is not on a radial line. Therefore, when the blade passes over this edge, which serves as a scraper, the outer end of the blade and the outer part of the edge make contact first and gradually lose contact as movement of the blade continues. The inner lower corner of the blade makes and loses contact with the edge last, after the central portion has passed beyond the edge. With this arrangement it will be seen that the deformation of the blade and the return of the blade to its normal condition proceed gradually from its outer end to its inner end. Thus, there is no slapping of the surface of the liquid on the far side of the trough and, consequently, no setting up of disturbances causing loss of gas from and settling of any of the surfaced sludge.

The operation of the skimmer blades may be either continuous or intermittent. Intermittent operation sometimes increases the consistency of the sludge, which is usually desirable.

Referring now to Fig. 11, in which parts corresponding to or functionally equivalent to parts shown in the other figures are similarly designated, the numerals, however, being primed in each instance, it will be noted that the lower header is here omitted, the liquid to be charged with the gas bubbles being drawn instead from a suction box 60 depending from the trough 37'. This construction is somewhat less costly than the construction of Fig. 1, but in many cases is equally efficient.

In the practice of the invention, the operating conditions may vary within substantial limits depending on the character of the liquid being processed. Generally, however, in the case of the particular apparatus disclosed, the upward velocity of the liquid in the central riser pipe 16 lies within the range 10–60 feet per minute, the downward velocity of the liquid in the flotation zone 15 within the range 0.1–0.6 feet per minute and the upward velocity of the liquid in the weir chamber, i. e., the annular space between the wall 11 and the baffle 14, within the range 1.5–9 feet per minute. These figures are applicable irrespective of the volumetric capacity of the unit.

From the foregoing it is believed apparent that my invention enables the efficient clarification of suspensions which cannot be successfully clarified by the settling procedures of the prior art. I consider my invention as representing a major step forward in the satisfactory solution of the problems, affecting both industry and the general public, deriving from the practice of discharging industrial waste waters into streams, harbors, etc. In many instances, the value of the recovered material quickly offsets the capital cost of the unit and the operating and maintenance expenses are never excessive.

It cannot be too strongly emphasized that my invention may be found useful in connections in no way involving supply or waste waters. Thus, it may be found to possess great utility in the oil and chemical industries, for example, or in sugar refining in the removal of suspended matter or coagulable impurities from raw sugar juice or concentrates. In the soap industry, the invention is applicable not only to the treatment of waste liquors but to the separation of fats from glycerine before charging of the latter to the stills.

Many modifications of the apparatus herein may, of course, be made without departing from the spirit and scope of the invention.

The invention herein was first described in my application Serial No. 37,588, filed July 8, 1948, now abandoned.

What I claim is:

1. Flotation apparatus comprising in combination, a cylindrical flotation vessel, an annular baffle member within said vessel delineating a flotation zone and forming a weir chamber with said vessel communicating with said zone near the bottom thereof, an adjustable weir band encircling the rim of said vessel, header means in the lower portion of said zone through which in operation of the apparatus liquid is withdrawn from charging with minute gas bubbles, similar header means spaced just above said last-mentioned header means through which the charged liquid is returned to said zone, vertical conduit means concentric with the vertical axis of said vessel for introducing feed liquid into said zone, said conduit means terminating at a point between said header means and the line of the liquid level at which the apparatus is adapted to be operated, a distributor member concentric with the vertical axis of said vessel spaced above the point of termination of said conduit means and means adapted in operation of the apparatus to remove matter ascending to the surface of the liquid in said zone.

2. Flotation apparatus comprising in combination, a cylindrical flotation vessel, an annular baffle member within said vessel delineating a flotation zone and forming a weir chamber with said vessel communicating with said zone near the bottom thereof, an adjustable weir band encircling the rim of said vessel, trough means surrounding said vessel at the top thereof for collecting liquid overflowing said weir band, a suction box depending from said trough, means for withdrawing liquid from said trough for charging with minute gas bubbles, header means near the bottom of said zone through which the charged liquid is returned to said zone, vertical conduit means concentric with the vertical axis of said vessel for introducing feed liquid into said zone, said conduit means terminating at a point between said header means and the line of the liquid level at which the apparatus is adapted to be operated, a distributor member concentric with the vertical axis of said vessel spaced above the point of termination of said conduit means and means adapted in operation of the apparatus to remove matter ascending to the surface of the liquid in said zone.

3. Flotation apparatus comprising in combination, a cylindrical flotation vessel, an annular baffle member within said vessel delineating a flotation zone and forming a weir chamber therewith communicating with said zone near the bottom thereof, a weir band encircling the rim of said vessel, trough means surrounding said vessel at the top thereof for collecting liquid overflowing said weir band, header means for withdrawing liquid from the lower portion of said zone, means outside said vessel for charging the withdrawn liquid with minute gas bubbles, header means similar to said first-mentioned header means and spaced immediately thereabove through which the charged liquid is returned to said zone, vertical conduit means concentric with the vertical axis of said vessel for introducing feed liquid into said zone, said conduit means terminating at a point between said header means and the line of the liquid level at which the apparatus is adapted to be operated, a distributor member concentric with the vertical axis of said vessel spaced above the point of termination of said conduit means and means adapted in operation of the apparatus to remove matter ascending to the surface of the liquid in said zone.

References Cited in the file of this patent

UNITED STATES PATENTS

| Number | Name | Date |
|---|---|---|
| 721,036 | Gwynne et al. | Feb. 17, 1903 |
| 929,192 | Buchler | July 27, 1909 |
| 1,056,548 | Imhoff | Mar. 18, 1913 |
| 1,285,061 | Daman | Nov. 19, 1918 |
| 1,398,394 | Robbins | Nov. 29, 1921 |
| 1,703,041 | Imhoff | Feb. 19, 1929 |
| 1,870,435 | Baker | Aug. 9, 1932 |
| 1,943,180 | Karlstrom | Jan. 9, 1934 |
| 2,102,575 | Shafer | Dec. 14, 1937 |
| 2,198,305 | Crawford | Apr. 23, 1940 |
| 2,220,574 | Little et al. | Nov. 5, 1940 |
| 2,248,177 | Karlstrom | July 8, 1941 |
| 2,324,400 | Kelly et al. | July 13, 1943 |
| 2,364,022 | Gillard | Nov. 28, 1944 |
| 2,375,282 | Clemens | May 8, 1945 |
| 2,446,655 | Lawrason | Aug. 10, 1948 |
| 2,462,948 | Costa et al. | Mar. 1, 1949 |
| 2,604,445 | Lansing | July 22, 1952 |

FOREIGN PATENTS

| Number | Country | Date |
|---|---|---|
| 23,200 | Great Britain | of 1902 |
| 407,001 | Great Britain | Feb. 26, 1934 |
| 457,149 | Great Britain | Nov. 23, 1936 |
| 33,200 | Sweden | Feb. 15, 1909 |